(12) United States Patent
Lu et al.

(10) Patent No.: US 11,626,768 B2
(45) Date of Patent: Apr. 11, 2023

(54) MOTOR

(71) Applicant: Delta Electronics, Inc., Taoyuan (TW)

(72) Inventors: Yi-Ta Lu, Taoyuan (TW); Wei-Ming Lai, Taoyuan (TW); Yun-Hung Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 272 days.

(21) Appl. No.: 16/905,706

(22) Filed: Jun. 18, 2020

(65) Prior Publication Data
US 2020/0403478 A1 Dec. 24, 2020

Related U.S. Application Data

(60) Provisional application No. 62/863,403, filed on Jun. 19, 2019.

(51) Int. Cl.
*H02K 5/10* (2006.01)
*H02K 5/22* (2006.01)
*H02K 1/32* (2006.01)
*H02K 5/18* (2006.01)

(52) U.S. Cl.
CPC ............... *H02K 5/10* (2013.01); *H02K 1/32* (2013.01); *H02K 5/18* (2013.01); *H02K 5/22* (2013.01); *H02K 2203/03* (2013.01)

(58) Field of Classification Search
CPC .... H02K 1/2786; H02K 1/32; H02K 2203/03; H02K 5/10; H02K 5/18; H02K 5/22; H02K 7/14; H02K 9/06
See application file for complete search history.

(56) References Cited

U.S. PATENT DOCUMENTS

| | | | |
|---|---|---|---|
| 6,356,005 B1* | 3/2002 | Hsu | H02K 11/33 310/67 R |
| 7,939,978 B2 | 5/2011 | Best et al. | |
| 3,531,065 A1 | 9/2013 | Knorr et al. | |
| 9,531,239 B2 | 12/2016 | Maschke et al. | |
| 9,806,567 B2 | 10/2017 | Lee et al. | |

(Continued)

FOREIGN PATENT DOCUMENTS

| | | | |
|---|---|---|---|
| CN | 105099054 B | * 5/2018 | ............. F04D 17/08 |
| CN | 109256911 A | 1/2019 | |

(Continued)

*Primary Examiner* — Naishadh N Desai
(74) *Attorney, Agent, or Firm* — Kirton McConkie; Evan R. Witt

(57) ABSTRACT

The present disclosure provides a motor including a stator, a rotor and a first circuit board. The stator includes a winding assembly including a plurality of coils. A conductive element is extended out from the winding assembly and is electrically connected to a first electrical connector. The first electrical connector penetrates through a pillow of the stator and is electrically connected to the first circuit board. The motor further includes a second circuit board, and the second circuit board is electrically connected to the first circuit board. The first electrical connector serves as a connector for electrically connecting the winding assembly to the first circuit board. The present disclosure has the advantage of easy installation by replacing the conventional wire binding plate with the first circuit board.

20 Claims, 12 Drawing Sheets

(56) References Cited

U.S. PATENT DOCUMENTS

| | | | |
|---|---|---|---|
| 2003/0160537 A1* | 8/2003 | Hsu | H02K 11/046 310/254.1 |
| 2006/0006094 A1 | 1/2006 | Hofmann et al. | |
| 2010/0187920 A1 | 7/2010 | Best et al. | |
| 2015/0340923 A1 | 11/2015 | Lee et al. | |
| 2017/0104378 A1 | 4/2017 | Dawson et al. | |

FOREIGN PATENT DOCUMENTS

| | | | |
|---|---|---|---|
| EP | 1361644 A2 * | 11/2003 | H02K 11/33 |
| EP | 1490949 B1 | 5/2006 | |
| JP | 2002345211 A | 11/2002 | |

* cited by examiner

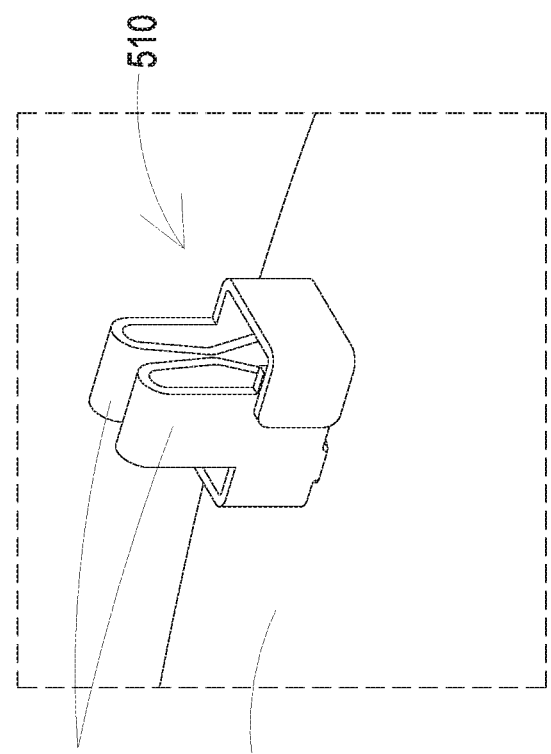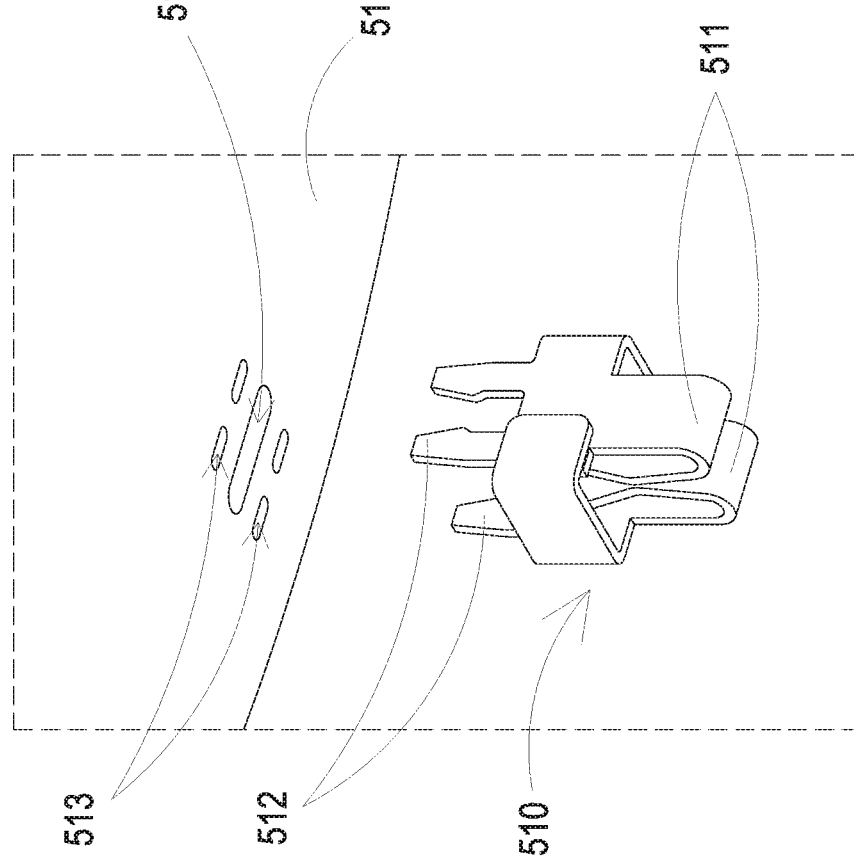
FIG. 6C
FIG. 6B

MOTOR

CROSS-REFERENCE TO RELATED APPLICATION

This application claims the benefit of U.S. Provisional Application No. 62/863,403 filed on Jun. 19, 2019, entitled "FAN". The entire contents of the above-mentioned patent application are incorporated herein by reference for all purposes.

FIELD OF THE INVENTION

The present disclosure relates to a motor, and more particularly to a motor using a circuit board to replace the conventional wire binding plate.

BACKGROUND OF THE INVENTION

Motor is a kind of electric machine that generates induction magnetism by providing electrical energy to the coil on the stator and further makes the rotor rotate. It is an important topic to simplify the complexity of assembling motor in the current development.

In the stator structure of conventional motor, the steps of assembling the wire binding plate are complicated and cumbersome, which may easily lead to wire binding errors. Moreover, the wire binding plate and the coil of the winding assembly are easy to cause short circuit problems during installation.

In addition, when the motor is used for general or outdoor applications, the rotor is susceptible to moisture at the rotating position. When the stator inside the rotor is further electrically connected to the wire binding plate and the circuit board, a structure for blocking moisture is required.

Therefore, there is a need of providing a motor to obviate the drawbacks encountered from the prior arts.

SUMMARY OF THE INVENTION

It is an objective of the present disclosure to provide a motor to simplify the steps and complexity of assembling motor by replacing the conventional wire binding plate with the circuit board.

It is another objective of the present disclosure to provide a motor. A waterproof element is disposed in the insertion hole of the plate of the pillow of the motor. The waterproof element is configured for a first electrical connector to penetrate therethrough, and the waterproof element surrounds the first electrical connector to achieve waterproof and insulation functions.

To achieve the above purpose, a motor is provided. A stator of the motor includes a winding assembly and a pillow. A conductive element is extended out from the coil of the winding assembly, and the conductive element is connected to the first electrical connector. The pillow has a shaft tube and a plate. The shaft tube is disposed on the plate. The winding assembly is disposed circumferentially on the shaft tube. The plate has an inner side. A first insertion hole is disposed on the inner side of the plate and is configured for the first electrical connector to penetrate therethrough. A first circuit board is disposed on an opposite side of the plate relative to the shaft tube. The first circuit board is electrically connected to the winding assembly through the first electrical connector.

In the present disclosure, the waterproof element is partially disposed in the first insertion hole. Therefore, the moisture at a side, where the shaft tube is disposed, of the pillow is avoided affecting the first circuit board at the other side of the pillow through the first through hole when the first electrical connector penetrates through the plate.

Moreover, the functions of the first circuit board are similar to that of the wire binding plate of the conventional motor, and the first circuit board can be a winding structure or a printed circuit board. The first electrical connector is extended out from the coils. As long as a simple alignment assembly is performed, the winding assembly can be electrically connected to the first circuit board through the first electrical connector, which can simplify the manufacturing process.

In accordance with an embodiment of the present disclosure, the motor further includes a second circuit board electrically connected to the first circuit board. The second circuit board functions as the circuit board in the conventional motor. The second circuit board is provided with electronic components including a driving integrated circuit.

In accordance with an embodiment of the present disclosure, the pillow further includes a cylinder extending axially from the plate, and the cylinder and the plate form an accommodating space for accommodating the first circuit board and the second circuit board.

In accordance with an embodiment of the present disclosure, a first insulation plate is disposed between the pillow and the first circuit board.

In accordance with an embodiment of the present disclosure, a clamp is disposed on the first circuit board, and is configured for clamping the first electrical connector to electrically connect the first circuit board and the winding assembly.

BRIEF DESCRIPTION OF THE DRAWINGS

FIG. 6B is a schematic enlarged view of the square A of FIG. 6A;

FIG. 6C is a schematic view illustrating a clamp of FIG. 6B according to another embodiment of the present disclosure;

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
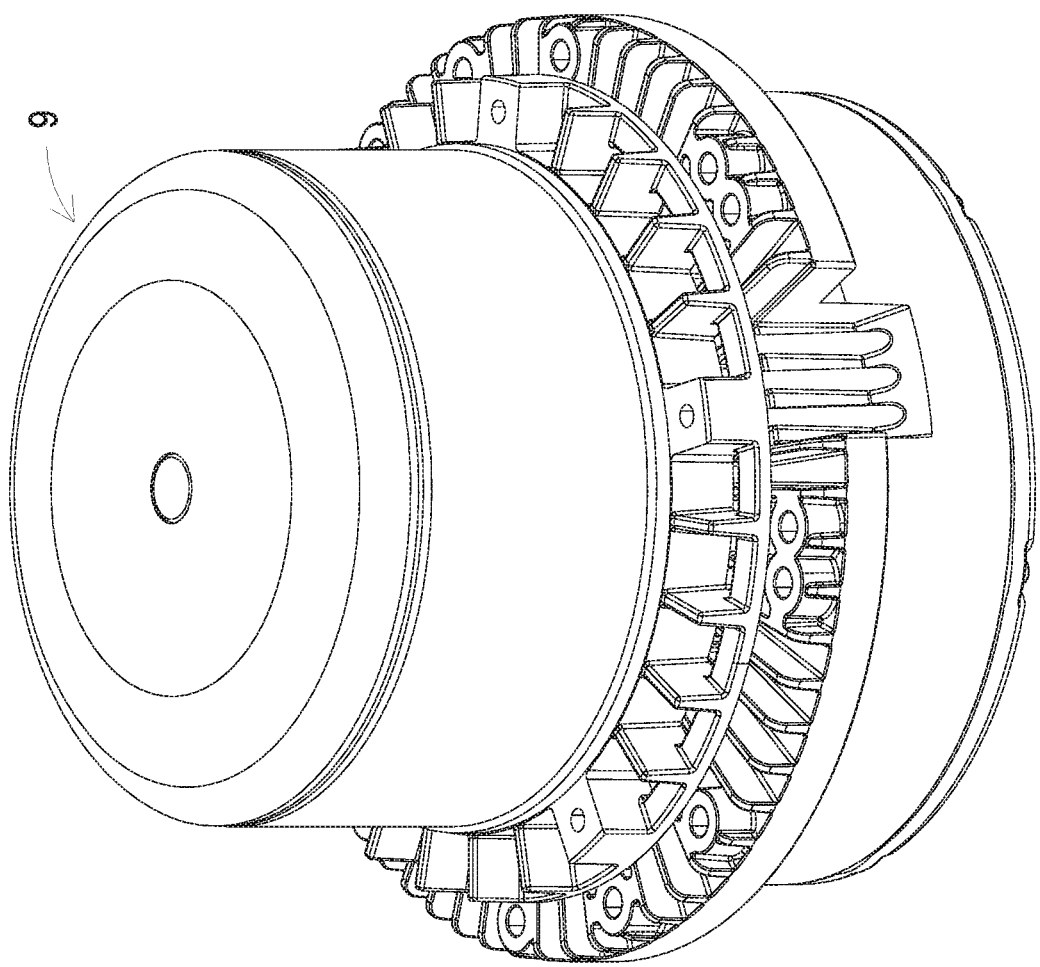
FIG. 1 is a schematic perspective view illustrating a motor according to an embodiment of the present disclosure.
Figure 2:
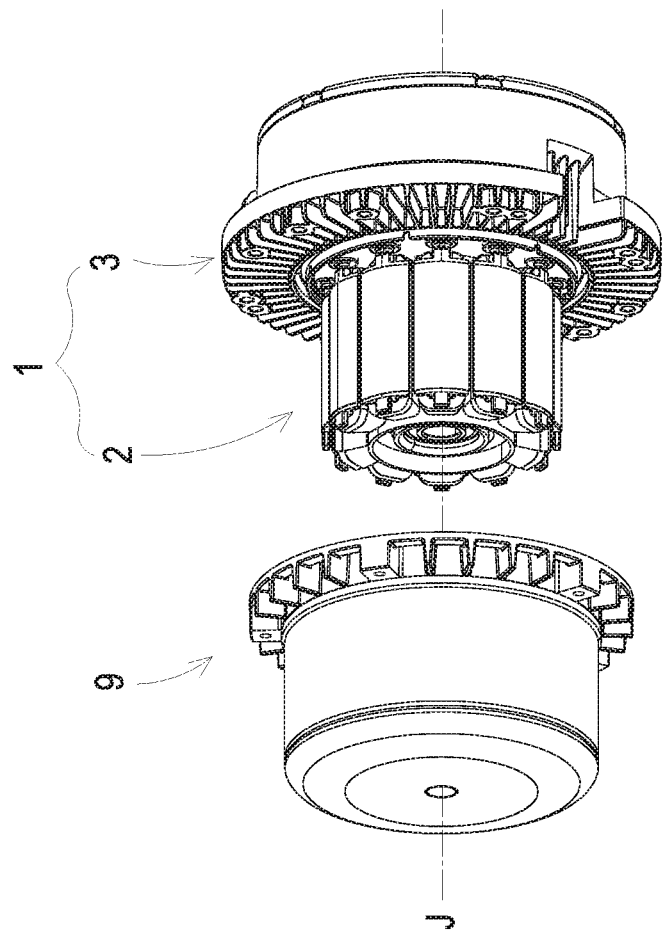
FIG. 2 is a schematic exploded view of the motor of FIG. 1.

Please refer to FIGS. 1 and 2. FIG. 1 is a schematic perspective view illustrating a motor 10 according to an embodiment of the present disclosure. FIG. 2 is a schematic exploded view of the motor 10 of FIG. 1. The motor 10 includes a stator 1 and a rotor 9. The stator 1 includes a winding assembly 2 and a pillow 3. The rotor 9 is sleeved on the winding assembly 2, and the rotor 9 rotates along a central axis J. In other words, the rotor 9 is disposed circumferentially with respect to the central axis J.

In the figures of the present disclosure, the axial direction is assumed to be the direction in which the central axis J of the stator 1 extends. The direction parallel or substantially parallel to the central axis is referred to by the term "axial" or "axially". With the central axis as the center, the directions away from the central axis are simply referred to as the term "radial" or "radially", and the circumferential direction around the central axis is simply referred as the term "circumferential" or "circumferentially".

Figure 3:
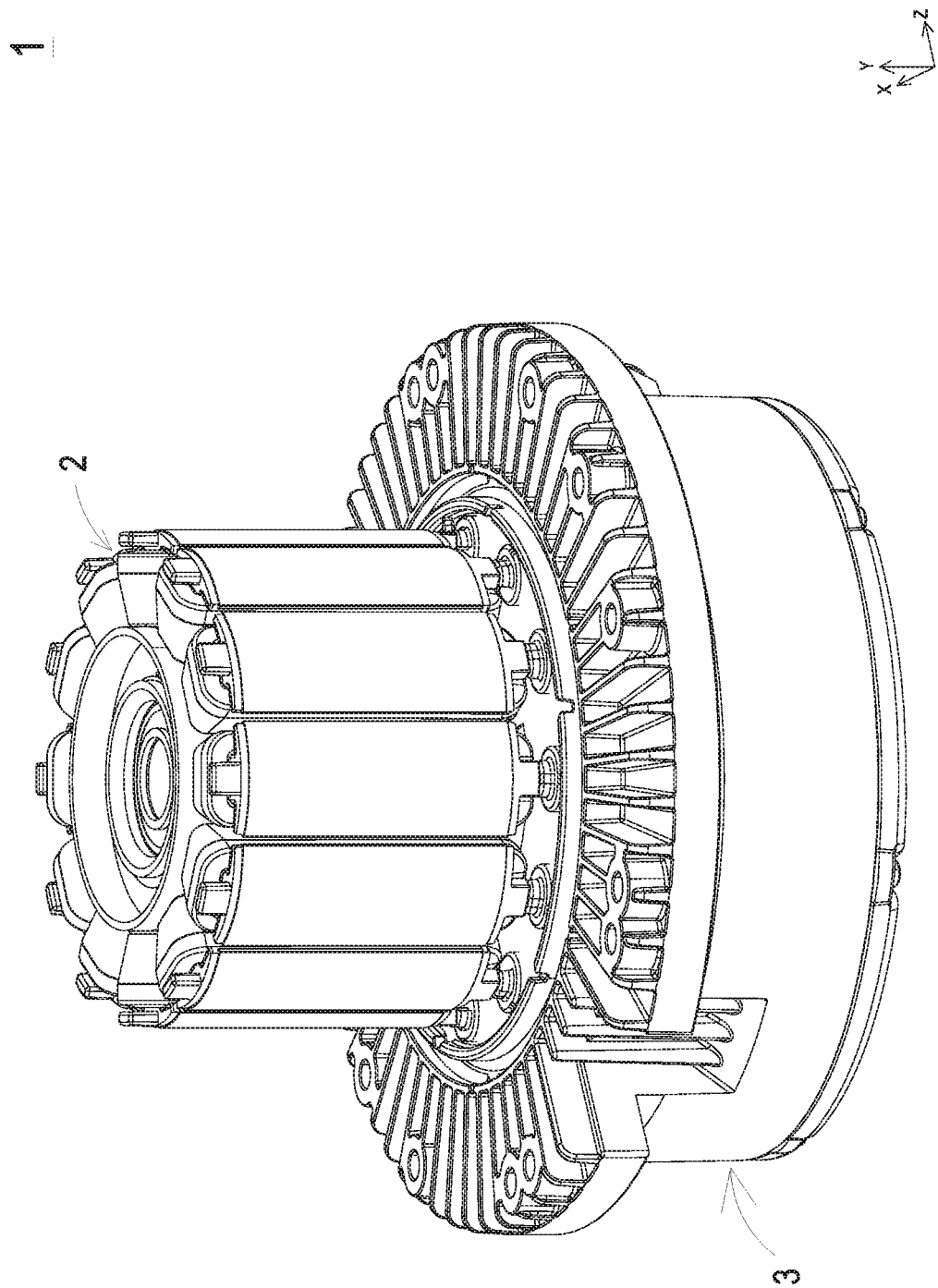
FIG. 3 is a schematic perspective view illustrating a stator of the motor according to an embodiment of the present disclosure.
Figure 4:
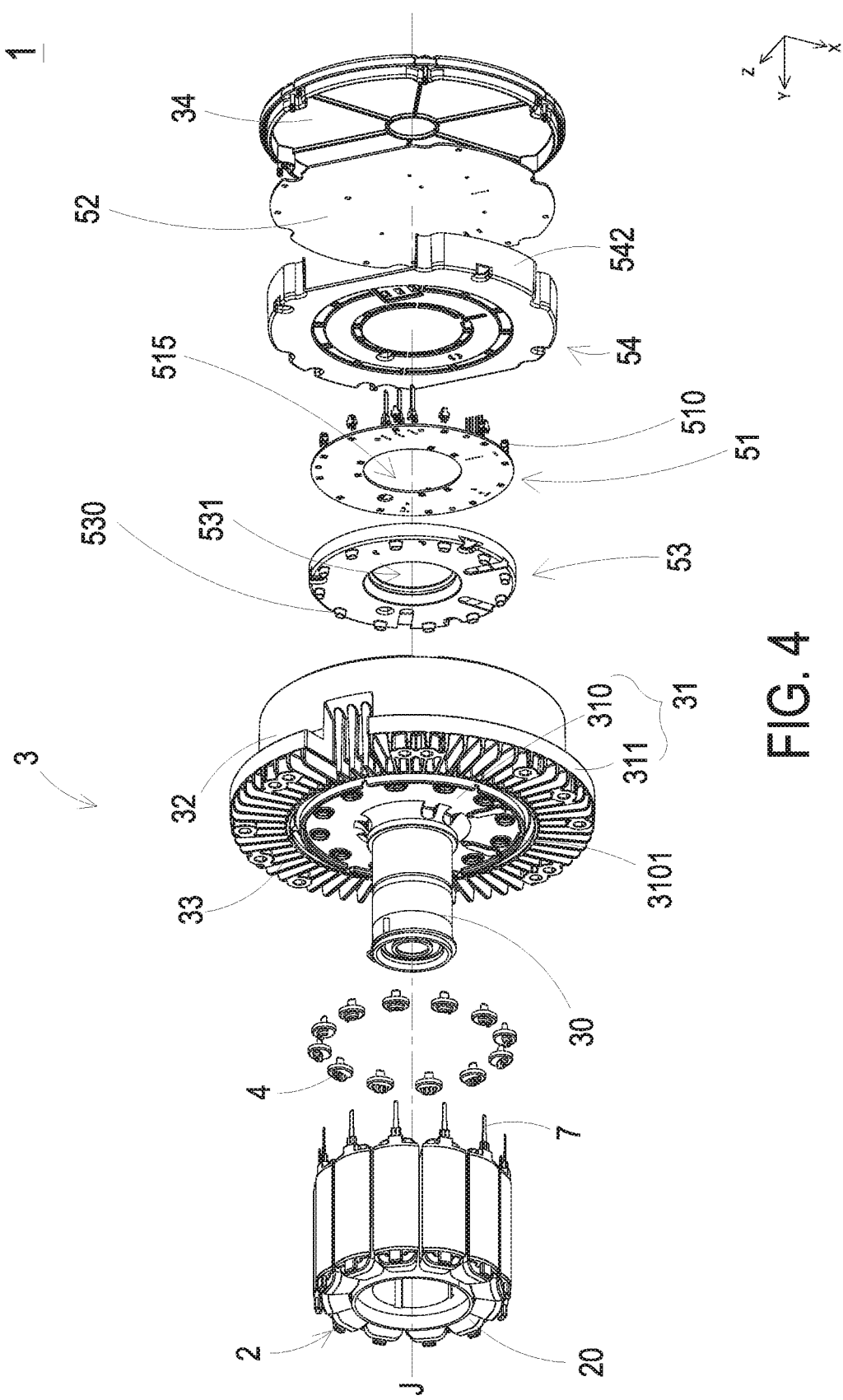
FIG. 4 is a schematic exploded view of the stator of the motor of FIG. 3.
Figure 5:
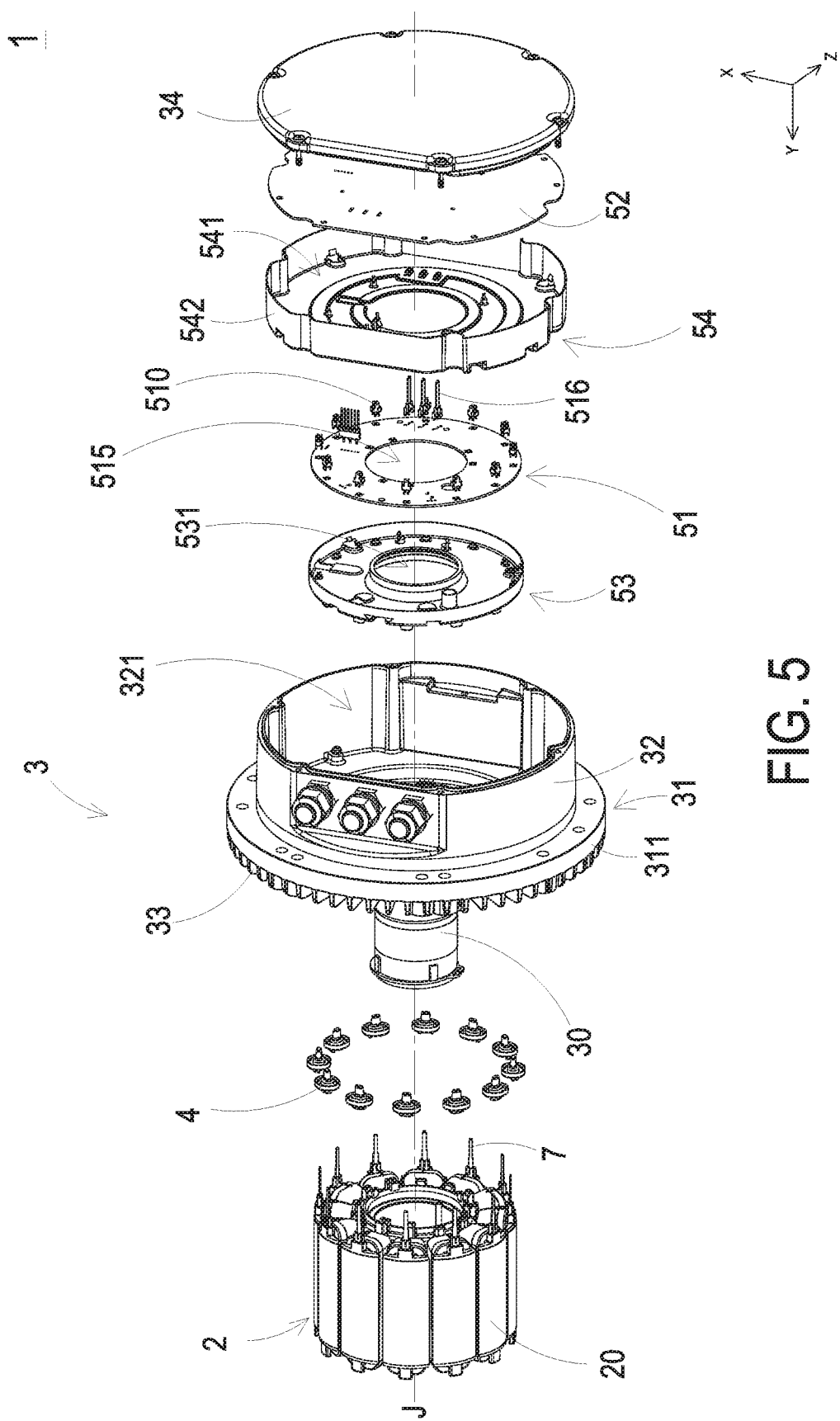
FIG. 5 is a schematic exploded view of the stator of motor of FIG. 3 at another viewing angle.

Please refer to FIGS. 3, 4 and 5. FIG. 3 is a schematic perspective view illustrating a stator 1 of the motor 10 according to an embodiment of the present disclosure. FIG. 4 is a schematic exploded view of the stator 3 of FIG. 3. FIG. 5 is a schematic exploded view of the stator 1 of FIG. 3 at another viewing angle. The stator 1 includes a winding assembly 2 and a pillow 3. The pillow 3 includes a shaft tube 30 and a plate 31. The shaft tube 30 is disposed on a side of the pillow 3 connected to the rotor 9. The winding assembly 2 is disposed circumferentially on the shaft tube 30. The plate 31 has an inner side 310 neighboring to the shaft tube 30 and a flange 311 disposed circumferentially on the inner side 310. A heat dissipation member 33 is disposed on a side of the flange 311 of the plate 31 facing the shaft tube 30. Substantially, the heat dissipation member 33 extends axially with respect to the flange 311 of the plate 31 and extends radially with respect to the shaft tube 30. A first insertion hole 3101 is disposed on the inner side 310 of the plate 31. A waterproof element 4 is at least partially disposed in the first insertion hole 3101. The winding assembly 2 has a plurality of coils 20, and a conductive element is extended out from each coil 20 and is connected to a first electrical connector 7. The first electrical connector 7 penetrates through the waterproof element 4 and the first insertion hole 3101. An end of the first electrical connector 7 is located at an opposite side of the plate 31, which is opposite to the side where the shaft tube 30 is disposed. The conductive elements are extended out from the plurality of coils 20 respectively, and each conductive element is electrically connected to the corresponding first electrical connector 7 directly. Alternatively, the coils with the same phase are electrically connected to each other, and then connected to the first electrical connector 7 via the same conductive element.

The pillow 3 further includes a cylinder 32 disposed on the opposite side of the plate 31. The cylinder 32 is substantially a cylindrical structure extending axially, and the cylinder 32 forms a first space 321. A first circuit board 51 is disposed in the first space 321. A clamp 510 is disposed on the first circuit board 51, and a first opening 515 is disposed at the center of the first circuit board 51. The first electrical connector 7 extended from the coil 20 penetrates the plate 31 through the first insertion hole 3101, and is contacted with the clamp 510 on the first circuit board 51. Accordingly, the coil 20 is electrically connected to the first circuit board 51 through the first electrical connector 7. The number of the first insertion hole 3101 is basically the same as that of the first electrical connector 7. Furthermore, the number of the clamp 510 is also the same as that of the first electrical connector 7.

Generally, the entire pillow 3 is a metal structure. A first insulation plate 53 is disposed between the pillow 3 and the first circuit board 51. An insertion body 530 is disposed on the first insulation board 53 and is corresponding to the first insertion hole 3101. A second opening 531 is disposed at the center of the first insulation plate 53. The insertion body 530 has a perforation aligned with the first insertion hole 3101 for allowing the first electrical connector 7 to penetrate therethrough.

Please continue referring to FIGS. 4 and 5. A second circuit board 52 is further disposed in the first space 321 formed by the cylinder 32. A second insulation board 54 is disposed between the first circuit board 51 and the second circuit board 52. A side wall 542 is extended axially from the periphery of the second insulation plate 54 and forms a second space 541. The second circuit board 52 is disposed in the second space 541. The stator 1 further includes a cover 34 connected to the cylinder 32. Consequently, the first space 321 is substantially an enclosed space for accommodating the first insulation board 53, the first circuit board 51, the second insulation board 54 and the second circuit board 52.

In this embodiment, the second circuit board 52 has the same function as the circuit board of the conventional motor, and the first circuit board 51 has the same function as the wire binding plate of the conventional motor. Generally, the first circuit board 51 have no electrical elements such as the driving integrated circuit.

Figure 6A:
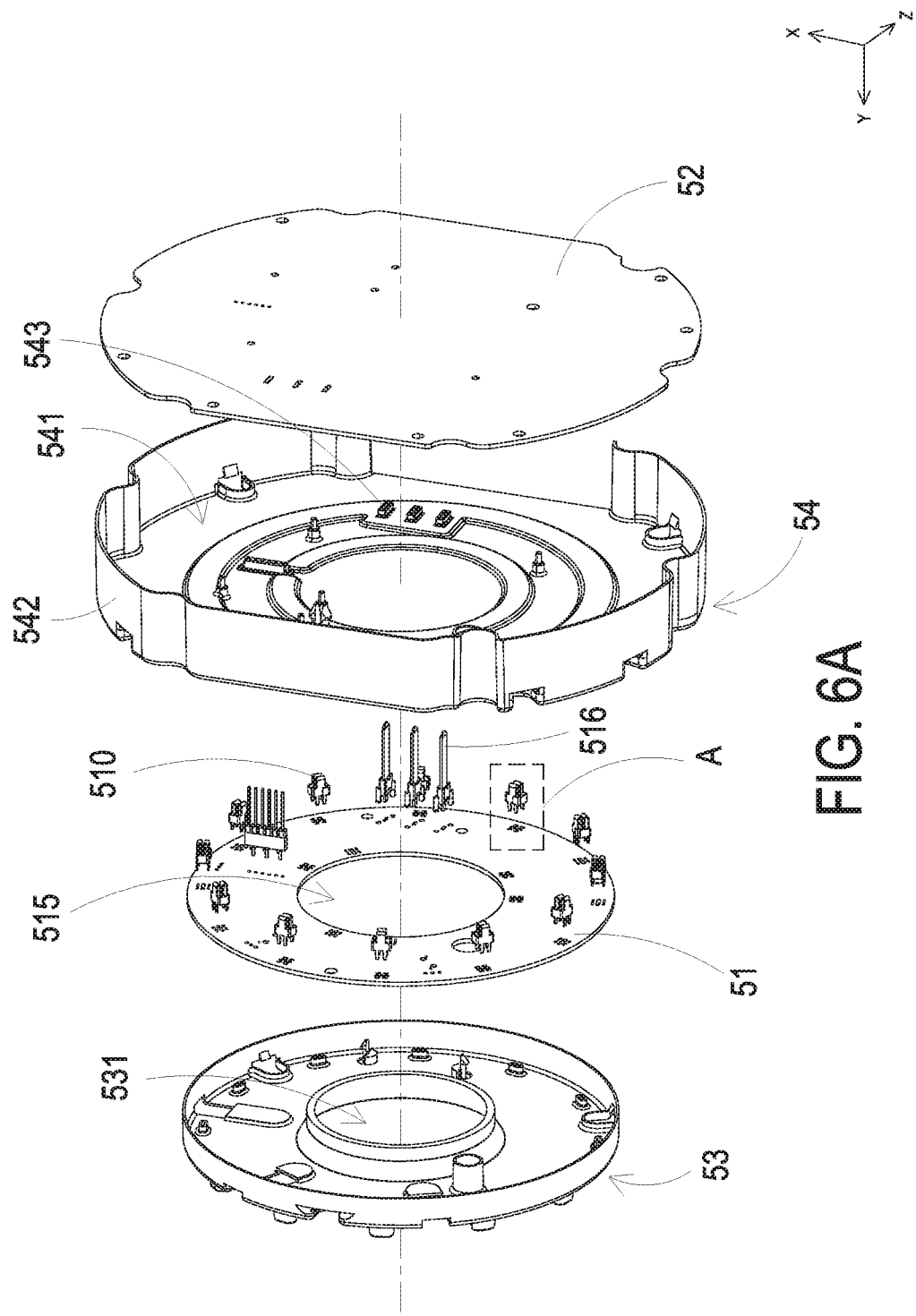
FIG. 6A is a schematic exploded view illustrating the circuit boards and the insulation plates of FIG. 5.

FIG. 6A is a schematic exploded view illustrating the two circuit boards and the two insulation plates in FIG. 5. Please refer to the FIGS. 5 and 6A, the first opening 515 of the first circuit board 51 and the second opening 531 of the first insulation plate 53 are axially aligned with each other, so that a shaft (not shown) is allowed to penetrate through the first opening 515 and the second opening 531. A second electrical connector 516 is disposed on the first circuit board 51, and the second electrical connector 516 penetrates through a second insertion hole 543 disposed on the second insulation board 54. Therefore, the first circuit board 51 and the second circuit board 52 are electrically connected to each other through the second electrical connector 516.

In FIG. 6A, the type of the second electrical connector 516 is a metal pin, but not limited thereto.

FIG. 6B is a schematic enlarged view of square A of FIG. 6A. Please refer to FIGS. 6A and 6B, the clamp 510 disposed on the first circuit board 51 is a conductive element including a clamping part 511 and an engaging part 512. The engaging part 512 penetrates through an engaging hole 513 of the first circuit board 51 correspondingly, and the clamp 510 is fixed on the first circuit board 51 and is electrically connected to the first circuit board 51. The clamping part 511 has two metal components, which can clamp the first electrical connector 7 shown in FIG. 5. The first circuit board 51 further includes a penetrating hole 514 corresponding to the clamping part 511. When the clamping part 511 clamps the first electrical connector 7, the penetrating hole 514 can be selectively provided for the first electrical connector 7 to penetrate therethrough.

In the embodiment shown in FIGS. 6A and 6B, the clamp 510 is disposed on a side of the first circuit board 510 neighboring to the second circuit board 52, which is the side away from the shaft tube 30, but not limit thereto.

Please continue referring to FIG. 6C. FIG. 6C is a schematic view illustrating the clamp 510 of FIG. 6B according to another embodiment of the present disclosure. The clamp 510 of the FIG. 6C is disposed on a side of the first circuit board 51 neighboring to the first insulation board 53, which is the side facing the shaft tube 30. In short, the clamp 510 serves as a connector electrically connected to the first circuit board 51, and the clamp 510 is configured to electrically connect the first electrical connector 7 to the first circuit board 51.

Figure 7B:
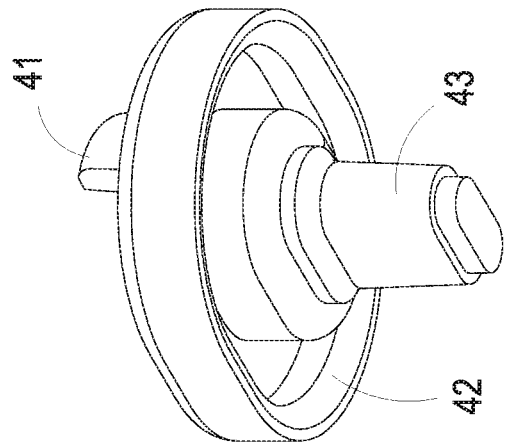
FIG. 7B is a schematic perspective view illustrating the waterproof element of FIG. 7A at another viewing angle.
Figure 7A:
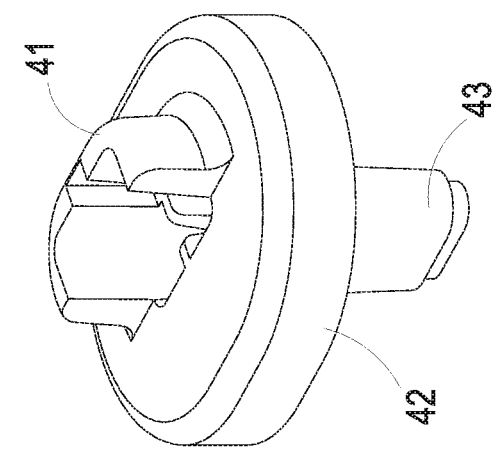
FIG. 7A is a schematic perspective view illustrating a waterproof element according to an embodiment of the present disclosure.

FIG. 7A is a schematic perspective view illustrating a waterproof element 4 according to an embodiment of the present disclosure. FIG. 7B is a schematic perspective view illustrating the waterproof element 4 of FIG. 7A at another viewing angle. Please refer to FIGS. 7A and 7B, the waterproof element 4 is a waterproof structure at least partially disposed in the first insertion hole 3101, and is configured for allowing the first electrical connector 7 to penetrate therethrough. The waterproof element 4 includes an airtight part 41, a positioning part 42 and an extension part 43. Preferably but not exclusively, the waterproof element 4 is made of rubber or plastic. When the waterproof element 4 is disposed, the extension part 43 is inserted into the first insertion hole 3101, and the airtight part 41 and the positioning part 42 are disposed on the inner side 310 of the plate 31 neighboring to the shaft tube 30.

Figure 8:
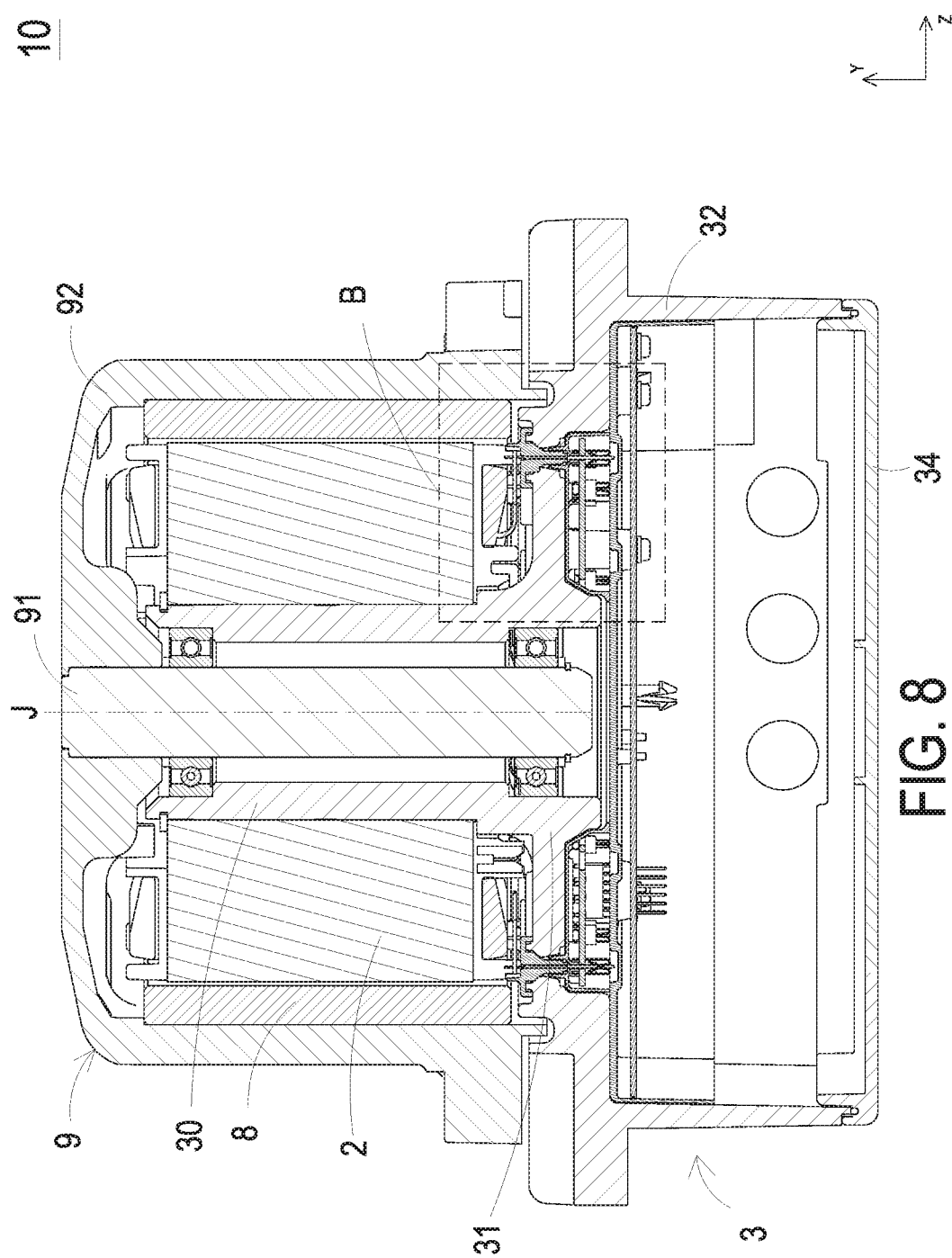
FIG. 8 is a schematic cross-sectional view showing the motor of FIG. 1.

Please refer to FIG. 8. FIG. 8 is a schematic cross-sectional view showing the motor 10 in FIG. 1. The winding assembly 2 is disposed circumferentially on the pillow 3 around the shaft tube 30. The rotor 9 includes a shaft 91 and a hub 92 connected to the shaft 91. The shaft 91 is disposed in the shaft tube 30, and a magnet 8 is disposed inside the hub 92 corresponding to the winding assembly 2. The shaft 91 drives the rotor 9 to rotate along the central axis J.

Figure 9:
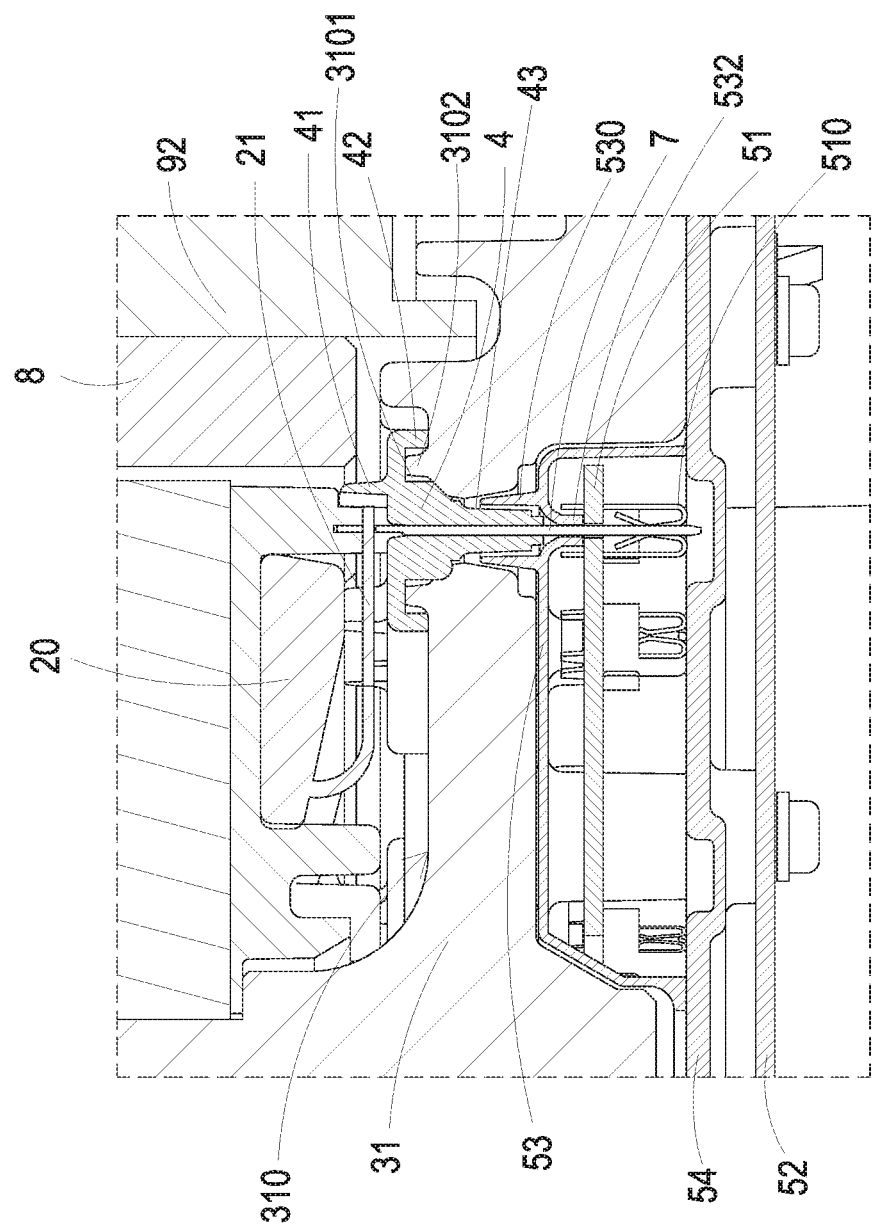
FIG. 9 is a schematic enlarged view of the square B of FIG. 8.

FIG. 9 is a schematic enlarged view of square B of FIG. 8. Please continue referring to FIGS. 8 and 9, the first electrical connector 7 is extended out from the coil 20 of the winding assembly 2, and the first electrical connector 7 penetrates through the first insertion hole 3101 at the inner side of the pillow 3 and is electrically connected to the first circuit board 51 in the first space 321. In the embodiment shown in FIG. 9, a conductive element 21 is extended from the coil 20, and the conductive element 21 is electrically connected to the first electrical connector 7 and penetrates through the waterproof element 4. In this embodiment, the conductive element 21 is generally a flexible wire. In terms of manufacturing, the conductive element 21 is connected to the rigid metal part of the first electrical connector 7 first, and then penetrates through the waterproof element 4.

Please continue referring to FIGS. 7A, 7B and 9. As mentioned above, when the waterproof element 4 is partially disposed in the first insertion hole 3101 as a waterproof structure, the extension part 43 is inserted into the first insertion hole 3101, and the airtight part 41 and the positioning part 42 are disposed on a side of the plate 31 neighboring to the shaft tube 30 (i.e., the side neighboring to the coil 20). A protrusion 3102 is disposed on a side of the inner side 310 of the plate 31 neighboring to the shaft tube 30, and the protrusion 3102 is adjacent to the first insertion hole 3101. Therefore, the positioning part 42 of the waterproof element 4 is engaged with the protrusion 3102 to fix the position of the waterproof element 4. After the positioning part 42 is engaged with the protrusion 3102, the airtight part 41 is located at a radial outer side of the conductive element 21 and has an insulation function. The first insulation board 53 disposed between the first circuit board 51 and the plate 31 has the insertion body 530. The insertion body 530 is disposed corresponding to the first insertion hole 3101, and the insertion body 530 further extends to the position between the plate 31 and the waterproof element 4 so as to fix the relative position of the first electrical connector 7 and the first circuit board 51. The second insulation plate 54 is configured as an insulator between the first circuit board 51 and the second circuit board 52. The first insulation board 53 further includes a guiding part 532 as a protrusion toward to the first circuit board 51. The guiding part 532 is disposed corresponding to the insertion body 530 and the first insertion hole 3101 of the plate 31 for guiding the first electrical connector 7 to make the first electrical connector 7 penetrate the first insulation board 53 and electrically connect the first circuit board 51 easily.

Figure 10:
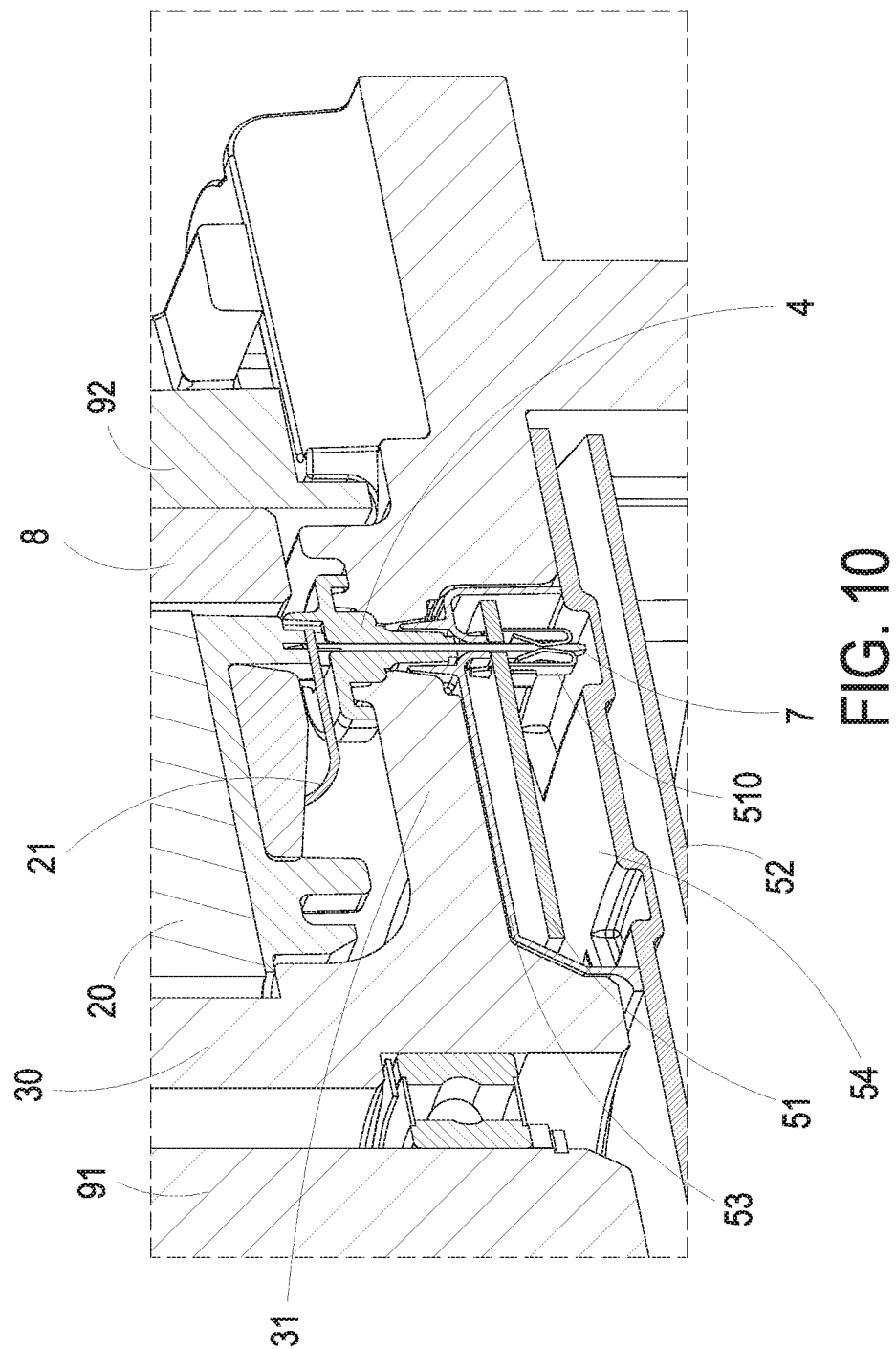
FIG. 10 is a schematic cross-sectional view illustrating a part of the motor according to an embodiment of the present disclosure.

FIG. 10 is a schematic cross-sectional view illustrating a part of the motor 10 according to an embodiment of the present disclosure. Please refer to FIGS. 9 and 10, the conductive element 21 extended out from the coil 20 is electrically connected to the first electrical connector 7. The conductive element 21 is electrically connected to the first electrical connector 7 by the clamping of the clamp 510. The first insulation board 53 is disposed between the plate 31 and the first circuit board 51 as the insulation protection for the electronic components on the first circuit board 51. When the first electrical connector 7 penetrates through the plate 31, the waterproof element 4 is disposed between the first electrical connector 7 and the plate 31, and the waterproof element 4 has an insulating function to prevent the first electrical connector 7 and the base 31 from being electrically connected.

Figure 11:
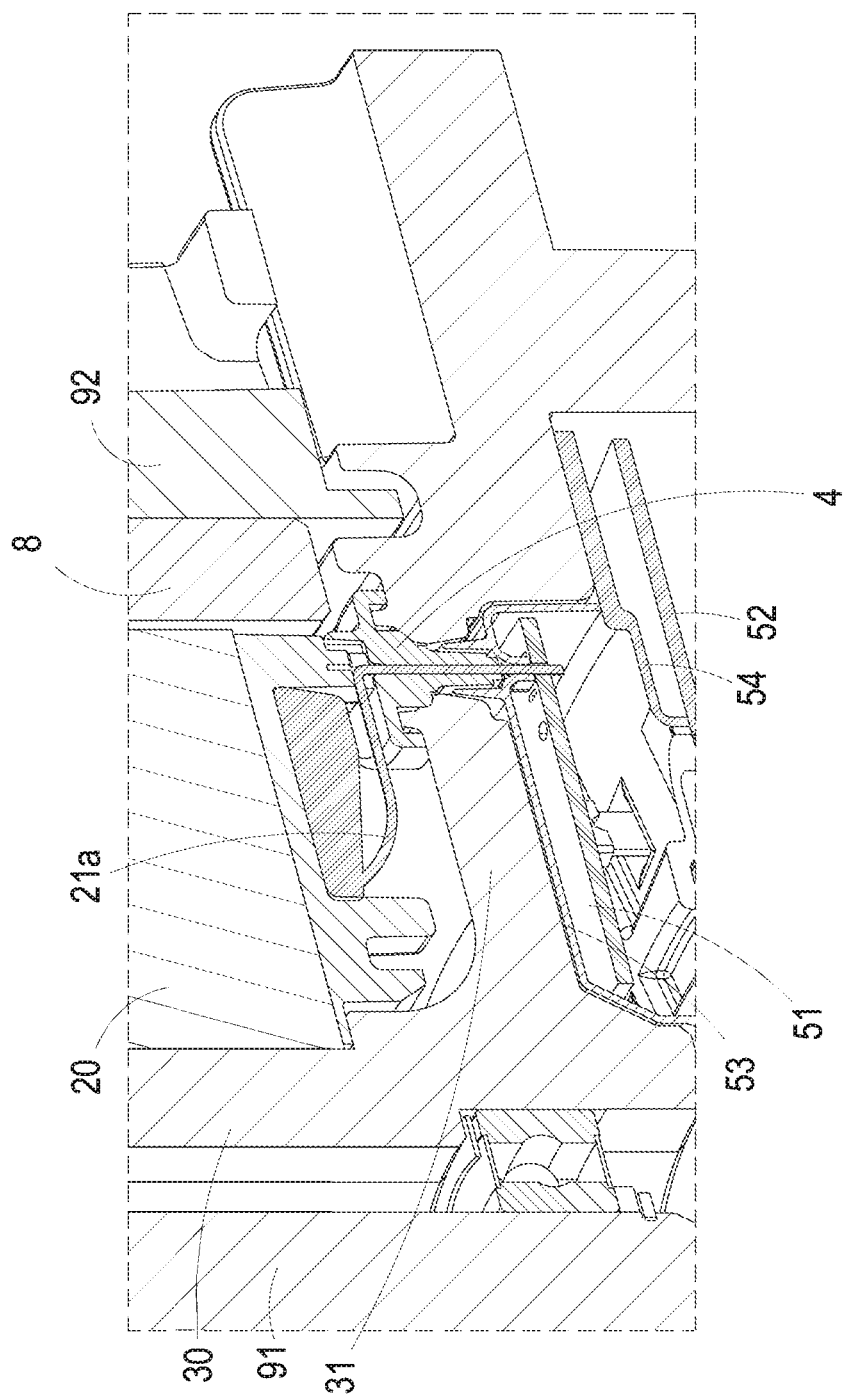
FIG. 11 is a schematic cross-sectional view illustrating a part of the motor according to another embodiment of the present disclosure.

FIG. 11 is a schematic cross-sectional view illustrating a part of the motor 10 according to another embodiment of the present disclosure. Compared with the embodiment shown in FIG. 10, the difference is that the conductive element 21a of FIG. 10 extended out from the coil 20 penetrates through the waterproof element 4 and is electrically connected to the first circuit board 51 directly. The corresponding relations and functions of the other components are the same as those in FIG. 10, and are not redundantly described herein.

From the above descriptions, the present disclosure provides a motor. By installing the circuit board to replace the wire binding plate of the conventional motor, the steps and complexity of assembling the motor are simplified, and the volume occupied by the motor winding can be eliminated. Furthermore, the waterproof element is disposed in the insertion hole, and the waterproof element is configured for the electrical connector to penetrate therethrough and can achieve the waterproof and insulation functions meanwhile.

While the disclosure has been described in terms of what is presently considered to be the most practical and preferred embodiments, it is to be understood that the disclosure needs not be limited to the disclosed embodiment.

What is claimed is:
1. A motor comprising:
   a stator comprising:

a winding assembly, wherein a conductive element is extended out from the winding assembly and is connected to a first electrical connector; and a pillow comprising a plate and a shaft tube extended from a side of the plate, wherein the plate has an inner side neighboring to the shaft tube, and the inner side of the plate has a first insertion hole for the first electrical connector to penetrate therethrough;

a rotor comprising a shaft, wherein the rotor is sleeved on the shaft tube and rotates along a central axis;

a first circuit board disposed on the other side of the plate and electrically connected to the first electrical connector; and a second circuit board electrically connected to the first circuit board.

2. The motor according to claim 1, further comprising a waterproof element, wherein the waterproof element is at least partially disposed in the first insertion hole and is configured for the first electrical connector to penetrate therethrough.

3. The motor according to claim 2, wherein the waterproof element comprises an extension part, the extension part is extended into the first insertion hole for being located between the plate and the first electrical connector.

4. The motor according to claim 3, wherein the waterproof element comprises a positioning part, and the positioning part is disposed on the side of the plate neighboring to the shaft tube.

5. The motor according to claim 4, wherein a protrusion is disposed on the side of the plate neighboring to the shaft tube, the protrusion is adjacent to the first insertion hole, and the positioning part is engaged with the protrusion.

6. The motor according to claim 3, further comprising a first insulation plate disposed between the first circuit board and the plate, wherein the first insulation plate has a guiding part disposed corresponding to the first insertion hole for guiding the first electrical connector.

7. The motor according to claim 1, wherein the pillow further comprises a cylinder extended axially from the plate, and the cylinder and the plate form a first space for accommodating the first circuit board and the second circuit board therein.

8. The motor according to claim 7, further comprising a second insulation plate disposed between the first circuit board and the second circuit board.

9. The motor according to claim 8, wherein the second insulation plate has a side wall extended axially from a periphery of the second insulation plate.

10. The motor according to claim 1, further comprising a clamp disposed on the first circuit board, wherein the clamp clamps the first electrical connector for electrically connecting the winding assembly to the first circuit board.

11. The motor according to claim 10, wherein the clamp has a clamping part for clamping the first electrical connector.

12. The motor according to claim 11, wherein the first circuit board has a penetrating hole corresponding to the clamping part.

13. The motor according to claim 10, wherein the first circuit board has an engaging part, the engaging part penetrates through an engaging hole on the first circuit board correspondingly, and the clamp is fixed on the first circuit board.

14. The motor according to claim 10, wherein the clamp is disposed on a side of the first circuit board away from the shaft tube.

15. The motor according to claim 10, wherein the clamp is disposed on a side of the first circuit board facing the shaft tube.

16. The motor according to claim 1, wherein the plate further comprises a flange disposed circumferentially on the plate, and a plurality of heat dissipation members are disposed on the flange.

17. A motor comprising:
a stator comprising:
a winding assembly, wherein a conductive element is extended out from the winding assembly; and
a pillow comprising a plate and a shaft tube extended from a side of the plate, wherein a first insertion hole is disposed on a position of the plate adjacent to the shaft tube, and the first insertion hole is configured for the conductive element to penetrate therethrough;

a rotor comprising a shaft, wherein the rotor is sleeved on the shaft tube and rotates along a central axis; and a first circuit board disposed on the other side of the plate, wherein the conductive element is electrically connected to the first circuit board.

18. The motor according to claim 17, further comprising a second circuit board electrically connected to the first circuit board.

19. The motor according to claim 17, further comprising a waterproof element at least partially disposed in the first insertion hole for the conductive element to penetrate therethrough.

20. The motor according to claim 17, further comprising a clamp disposed on the first circuit board, wherein the clamp clamps the conductive element.

* * * * *